July 25, 1933.   C. A. SCHACHT   1,919,866
FRUIT JAR OPENER
Filed Feb. 8, 1933
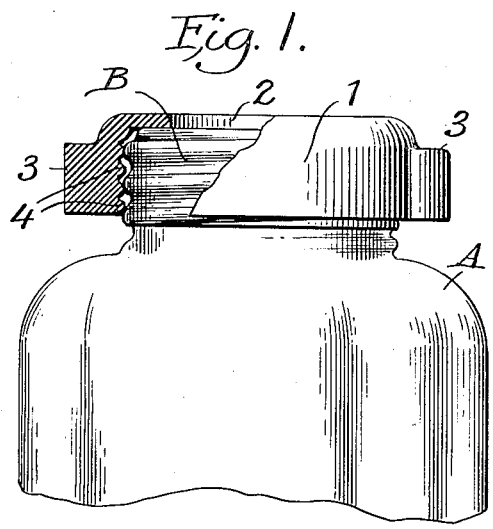
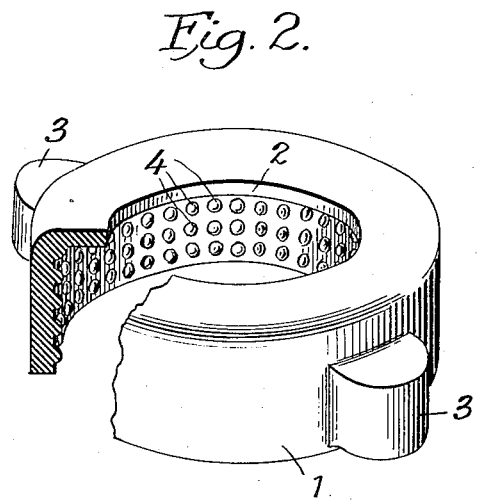
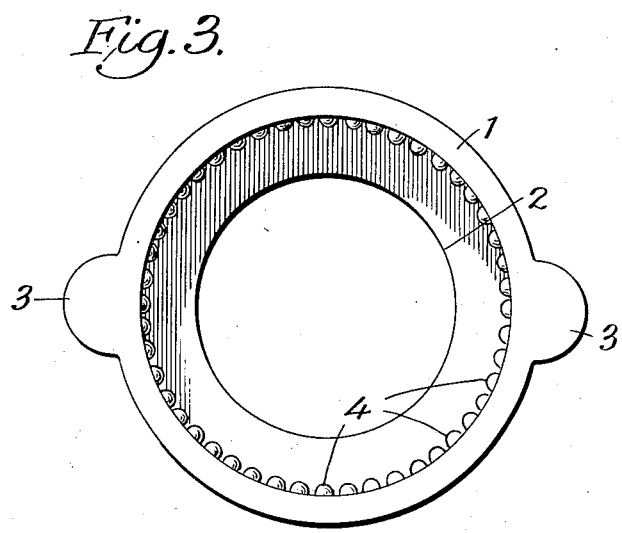
Inventor
Clifford A. Schacht
By Alexander Powell
Attorney Patented July 25, 1933

1,919,866

UNITED STATES PATENT OFFICE

CLIFFORD A. SCHACHT, OF HUNTINGTON, INDIANA

FRUIT JAR OPENER

Application filed February 8, 1933. Serial No. 655,809.

This invention relates to improvements in fruit jar openers, and the principal object of the invention is to provide a resilient cup-shaped body closely conforming with the exterior of a conventional "Mason" fruit jar top, said body having integral lugs on the outer side walls thereof spaced diametrically opposite each other to permit the body to be firmly grasped by the hand of the operator for turning the body, said body having a plurality of rows of inwardly projecting integral projections upon its inner side, said projections being substantially conical in form, and adapted to frictionally engage the outer side walls of the jar top; and said body being further provided with a central opening in its top so that when the operator grasps and compresses the body in order to bring the projections into frictional contact with the jar top the body may be readily deformed sufficiently to allow such distortion and compression.

Heretofore plain rings have been used but these have not proved satisfactory as the operator's hand slips. Also in such rings the outside walls have been corrugated or knurled, but this roughening has not proved satisfactory because it hurts the hands. My ring is made perfectly smooth on the outside except for the lugs or ears. The body is made somewhat smaller than the cap, and is simply placed over the jar lid so that by grasping the lugs or ears a good firm grip may be had thereon which will permit rotation of the body to open the lid, and will also permit the same to be tightened, and the operator's hand will not slip.

I will explain the invention with reference to the accompanying drawing which illustrates several practical embodiments thereof to enable others to adopt and use the same; and will summarize in the claim the novel features of construction, and novel combinations of parts for which protection is desired.

In the drawing:—

Fig. 1 is an elevation of the upper portion of a "Mason" fruit jar with top applied showing, in partial section, my novel top remover applied thereto.

Fig. 2 is a perspective of my openers, detached, but showing a portion cut away to expose the rows of projections.

Fig. 3 is a bottom plan view of the opener.

As shown, the "Mason" fruit jar A is of usual conventional form, provided with the usual top B which is threaded on its side walls in the usual manner, the jar and top forming no part of my present invention.

My novel opener consists of an inverted cup-shaped member 1, preferably formed of rubber or other resilient or pliable material, and conforms with the shape of the ordinary fruit jar top B except that same is provided with a central opening 2 in its top. The internal diameter of member 1 is somewhat less than the diameter of the top B so that it must be stretched slightly in applying same to the top B as in Fig. 1.

The outer side walls of member 1 are molded smooth, and diametrically disposed lugs or ears 3 are molded integrally with the member, said lugs or ears being rounded as shown and extending substantially the full height of the member to permit the hand of the operator to firmly grasp the member in compressing and rotating the member to tighten or loosen the cap B. The body 1 is simply placed over the jar top B. By grasping the lugs or ears a good grip can be had which permits rotating the member to open the lid, or tighten it, and the operator's hand will not slip. By making the exterior of the member 1 smooth the hand of the operator will not be chafed or rubbed in using the opener, and the smooth body and lugs will not in any way injure the hands of the operator in so far as it is resilient, and constant use of the opener will not make the operator's hands sore.

On the inner side walls of the member 1 are a plurality of rows of integral conical shaped rubber projections 4 adapted to frictionally engage the outer side walls of the fruit jar top B, when the operator places his hand over the cup-shaped member 1 and compresses the same to bring the rubber projections 4 against the sides of the jar cap B. When so compressed and twisted the cup-shaped member 1 will rotate the jar cap B so that the jar cap may be readily removed from and tightened upon the jar A without the hand of the operator at any time engaging or touching the jar cap, thereby preventing rubs, sores, or cuts to the hand usually experienced in removing the caps using opener rings having corrugated or knurled exterior surfaces. My opener is perfectly smooth on the outer sides and the grip is upon the ears or lugs. While I show two such lugs in the drawing more or less could be used to keep the hand from slipping.

The opener may be made very inexpensively, and can be molded all in one piece, and when it comes from the mold it is practically ready for the market. Also the openers could be made of flexible material other than rubber, although I prefer to make them of molded rubber.

I claim:—

A fruit jar opener comprising an inverted cup-shaped member of flexible resilient material adapted to conform snugly with the exterior of a jar top, said opener having a central opening in its top, and a plurality of integral projections of substantially conical form on the inner side walls of said member for engagement with the cap of the fruit jar, said projections being adapted to yieldably conform with the exterior of the cap.

CLIFFORD A. SCHACHT.